(12) United States Patent
Kupwade Patil et al.

(10) Patent No.: US 11,792,002 B2
(45) Date of Patent: Oct. 17, 2023

(54) CRYPTOGRAPHIC KEY GENERATION USING KUMMER VARIETIES

(71) Applicant: LG Electronics Inc., Seoul (KR)

(72) Inventors: Harsh Kupwade Patil, Fremont, CA (US); Paulo Sergio Licciardi Messeder Barreto, Santa Clara, CA (US); Jefferson E. Ricardini Fernandes De Oliveira, Sao Paulo (BR)

(73) Assignee: LG ELECTRONICS INC., Seoul (KR)

( * ) Notice: Subject to any disclaimer, the term of this patent is extended or adjusted under 35 U.S.C. 154(b) by 296 days.

(21) Appl. No.: 17/298,490

(22) PCT Filed: Dec. 26, 2019

(86) PCT No.: PCT/US2019/068566
§ 371 (c)(1),
(2) Date: May 28, 2021

(87) PCT Pub. No.: WO2020/139937
PCT Pub. Date: Jul. 2, 2020

(65) Prior Publication Data
US 2022/0021530 A1    Jan. 20, 2022

Related U.S. Application Data

(60) Provisional application No. 62/785,170, filed on Dec. 26, 2018.

(51) Int. Cl.
*H04L 29/06* (2006.01)
*H04L 9/08* (2006.01)
(Continued)

(52) U.S. Cl.
CPC ......... *H04L 9/0894* (2013.01); *H04L 9/0825* (2013.01); *H04L 9/0844* (2013.01);
(Continued)

(58) Field of Classification Search
CPC ... H04L 9/0894; H04L 9/0825; H04L 9/0844; H04L 9/3066; H04L 9/3252; H04L 9/3257
See application file for complete search history.

(56) References Cited

U.S. PATENT DOCUMENTS

| | | | |
|---|---|---|---|
| 7,181,620 B1* | 2/2007 | Hur ..................... | H04L 63/061 713/168 |
| 2011/0194694 A1* | 8/2011 | Struik .................. | H04L 9/3252 380/255 |

(Continued)

OTHER PUBLICATIONS

Faz-Hernandez, Armando, et al., "A secure and efficient implementation of the quotient digital signature algorithm (qdsa)", In: Internaiona 1 Conference on Security, Privacy and Applied Cryptography Engineering Springer, Cham, Nov. 22, 2017, pp. 170-189.
(Continued)

*Primary Examiner* — Harunur Rashid
(74) *Attorney, Agent, or Firm* — DUANE MORRIS LLP

(57) ABSTRACT

An authenticated, ID-based private/public key pair, with a self-certified public key, is generated using Kummer arithmetic without bilinear pairings. Two or more parties can generate such key pairs and use them as their respective long-term key pairs which, when combined with the parties' short-term key pairs, can allow the parties to establish an authenticated, short-term shared key. Some embodiments are suitable for connected vehicles communicating with each other and/or with other systems. Other features are also provided.

2 Claims, 10 Drawing Sheets

---

Algorithm D.1 SF(G, semifull)

INPUT: full affine generator G of order n.

OUTPUT: random scalar t (mod n), projective point T = [t]G (mod ±1 if semifull = true).

1: t ← Z/n
2: ±T, ±(T + G) ← ML⁺(t, ±G)
3: τ ← 𝔽_p \ {0}
4: if semifull then
5:     (X' : Y' : Z') ← OS(G, ±T, ±(T + G))
6:     return t, (τ · X' : τ · Y' : τ · Z')
7: else
8:     return t, (τ · X' : τ · Z')
9: end if

(51) Int. Cl.
H04L 9/30 (2006.01)
H04L 9/32 (2006.01)

(52) U.S. Cl.
CPC .......... *H04L 9/3066* (2013.01); *H04L 9/3252* (2013.01); *H04L 9/3257* (2013.01)

(56) References Cited

U.S. PATENT DOCUMENTS

| | | | | |
|---|---|---|---|---|
| 2012/0254620 A1* | 10/2012 | Ebeid | .................... | H04L 9/0841 |
| | | | | 713/180 |
| 2013/0067218 A2* | 3/2013 | Little | .................... | H04L 9/3263 |
| | | | | 713/156 |
| 2013/0246798 A1* | 9/2013 | Buckley | ................. | H04L 63/12 |
| | | | | 713/176 |

OTHER PUBLICATIONS

Renes, Joost et al., "qDSA: Small and secure digital signatures with curve based Diffie Hellman key pairs", In: International Conference on the Theory and Application of Cryptology and Information Security, Springer, Cham, Nov. 18, 2017, pp. 273-302.

* cited by examiner

Algorithm A.1 The (extended) Montgomery ladder, $ML^+(k, \pm P)$

INPUT: $k = \sum_{i=0}^{\ell} k_i 2^i$ with $k_\ell = 1$, and $\pm P = (X_P : Z_P) \in \mathfrak{O} = (X_k : Z_k)$
OUTPUT: $\pm[k]P = (X_k : Z_k) \in \mathfrak{O}$ if $\pm P \neq O$, otherwise $Z_k = O$; and also
$\pm[k+1]P = (X_{k+1} : Z_{k+1}) \in \mathfrak{O}$ if $\pm P \neq O$, otherwise $Z_{k+1} = O$.
COST: $\ell$ calls to xADD, $\ell + 1$ calls to xDBL, $\ell + 1$ calls to xSWP.

1: $(\pm R_0, \pm R_1) \leftarrow (\pm P, \text{xDBL}(\pm P))$
2: $swap \leftarrow 0$
3: for $i \leftarrow \ell - 1$ downto $0$ do
4:   $(\pm R_0, \pm R_1) \leftarrow \text{xSWP}(\pm R_0, \pm R_1, k_i \oplus swap)$
5:   $(\pm R_0, \pm R_1) \leftarrow (\text{xDBL}(\pm R_0), \text{xADD}(\pm R_0, \pm R_1, \pm P))$
6:   $swap \leftarrow k_i$
7: end for
8: $(\pm R_0, \pm R_1) \leftarrow \text{xSWP}(\pm R_0, \pm R_1, swap)$
9: return $(\pm R_0, \pm R_1)$

FIG. 3

Algorithm A.2 The Montgomery ladder, $ML(k, \pm P)$

INPUT: $k = \sum_{i=0}^{\ell} k_i 2^i$ with $k_\ell = 1$, and $\pm P = (X_P : Z_P) \in \mathfrak{O}$.
OUTPUT: $\pm[k]P = (X_k : Z_k) \in \mathfrak{O}$ if $\pm P \neq O$, otherwise $Z_k = O$.
COST: $\ell$ calls to xADD, $\ell + 1$ calls to xDBL, $\ell + 1$ calls to xSWP.

1: $(\pm R_0, \pm R_1) \leftarrow ML^+(k, \pm P)$
2: return $\pm R_0$

FIG. 4

Algorithm A.3 Montgomery differential addition, xADD($\pm P, \pm Q, \pm(Q-P)$)

INPUT: $\pm P = (X_P : Z_P), \pm Q = (X_Q : Z_Q), \pm(Q-P) = (X_- : Z_-) \in \mathfrak{G}$.
OUTPUT: $\pm(P+Q) = (X_+ : Z_+) \in \mathfrak{G}$ if $P+Q \neq O$, otherwise $X_+ = Z_+ = 0$.
COST: 4M + 2S + 3a, or 3M + 2S + 3a + 3s if $Z_-$ is normalized to 1.

1: $V_0 \leftarrow X_P + Z_P$
2: $V_1 \leftarrow X_Q - Z_Q$
3: $V_1 \leftarrow V_1 \cdot V_0$
4: $V_0 \leftarrow X_P - Z_P$
5: $V_2 \leftarrow X_Q + Z_Q$
6: $V_2 \leftarrow V_2 \cdot V_0$
7: $V_3 \leftarrow V_1 + V_2$
8: $V_3 \leftarrow V_3^2$
9: $V_4 \leftarrow V_1 - V_2$
10: $V_4 \leftarrow V_4^2$
11: $X_+ \leftarrow Z_- \cdot V_3$ // no multiplication when $Z_- = 1$
12: $Z_+ \leftarrow X_- \cdot V_4$
13: return $(X_+ : Z_+)$

FIG. 5

Algorithm A.4 Montgomery pseudo-doubling, xDBL(±P)

INPUT: ±P = (X_P : Z_P) ∈ $\mathbb{F}_{q^2}^2$

OUTPUT: ±[2]P = (X_2 : Z_2) ∈ ⊕ if P ≠ O, otherwise Z_2 = 0.

COST: 2M + 2S + 1c + 2a + 1s

1: $V_1 \leftarrow X_P + Z_P$
2: $V_1 \leftarrow V_1^2$
3: $V_2 \leftarrow X_P - Z_P$
4: $V_2 \leftarrow V_2^2$
5: $X_2 \leftarrow V_1 \cdot V_2$
6: $V_1 \leftarrow V_1 - V_2$
7: $V_3 \leftarrow ((A+2)/4) \cdot V_1$ // $(A+2)/4$ assumed to be a precomputed constant
8: $V_3 \leftarrow V_3 + V_2$
9: $Z_2 \leftarrow V_1 \cdot V_3$
10: return $(X_2 : Z_2)$

FIG. 6

Algorithm A.5 Isochronous conditional swapping, xSWP($\pm P, \pm Q$, swap)

INPUT: $\pm P = (X_P : Z_P), \pm Q = (X_Q : Z_Q) \in \mathbb{Z}/2^m \times \mathbb{Z}/2^m$; swap $\in \mathbb{Z}/2^m$.
NB: all quantities viewed as $m$-bit signed integers (in two's complement).

OUTPUT: $(\pm Q, \pm P)$ if swap $= 1$, otherwise $(\pm P, \pm Q)$.

1: mask $\leftarrow$ -swap // $0 \mapsto 0^m$, $1 \mapsto 1^m$
2: $X_\Delta \leftarrow (X_P \oplus X_Q)$ & mask
3: $Z_\Delta \leftarrow (Z_P \oplus Z_Q)$ & mask
4: return $(X_P \oplus X_\Delta : Z_P \oplus Z_\Delta), (X_Q \oplus X_\Delta : Z_Q \oplus Z_\Delta)$

FIG. 7

Algorithm B.1 The Renes-Smith test $RS(\pm P, \pm Q, \pm R)$

INPUT: $\pm P = (X_P : Z_P), \pm Q = (X_Q : Z_Q) \in \mathfrak{E}, \pm R \in \mathcal{P}_q$ such that $\pm R \in \mathfrak{E}.$
OUTPUT: Whether $\pm R \in \{\pm(P+Q), \pm(P-Q)\}.$
COST: $(6M + 2S + 1c + 3a + 2s) + (2M + 2a + 1s) = 8M + 2S + 1c + 5a + 3s,$
or $6M + 2S + 1c + 5a + 3s$ if $Z_P$ is normalized to 1.

1: $T_{XX} \leftarrow X_P \cdot X_Q$
2: $T_{XZ} \leftarrow X_P \cdot Z_Q$
3: $T_{ZX} \leftarrow Z_P \cdot X_Q$ // no multiplication when $Z_P = 1$
4: $T_{ZZ} \leftarrow Z_P \cdot Z_Q$ // no multiplication when $Z_P = 1$
5: $B_{XX} \leftarrow (T_{XX} - T_{ZZ})^2$
6: $B_{ZZ} \leftarrow (T_{XZ} - T_{ZX})^2$
7: $B_{XZ} \leftarrow (T_{XX} + T_{ZZ}) \cdot (T_{XZ} + T_{ZX}) + 2A \cdot T_{XX} \cdot T_{ZZ}$
8: $X_R \leftarrow \pm R$
9: return $((B_{ZZ} \cdot X_R - 2B_{XZ}) \cdot X_R + B_{XX} = 0)$ ? true : false

FIG. 8

Algorithm C.1 The Okeya–Sakurai reconstruction $OS(P, \pm Q, \pm(P+Q))$

INPUT: $P = (x_P : y_P : 1) \in (G); \pm Q = (X_Q : Z_Q); \pm(P+Q) = (X_+ : Z_+) \in \mathfrak{G}$, with $[2]P \neq O$ and $\pm Q \notin \{\pm P, O\}$.

OUTPUT: $Q = (X' : Y' : Z') \in (G)$.

COST: $10M + 1S + 2c + 3a + 3s$.

1: $v_1 \leftarrow x_P \cdot Z_Q$ // $1M$
2: $v_2 \leftarrow X_Q + v_1$ // $1a$
3: $v_3 \leftarrow X_Q - v_1$ // $1s$
4: $v_3 \leftarrow v_3^2$ // $1S$
5: $v_3 \leftarrow v_3 \cdot X_+$ // $1M$
6: $v_1 \leftarrow 2A \cdot Z_Q$ // $1c$
7: $v_2 \leftarrow v_2 + v_1$ // $1a$
8: $v_4 \leftarrow x_P \cdot X_Q$ // $1M$
9: $v_4 \leftarrow v_4 + Z_Q$ // $1a$
10: $v_2 \leftarrow v_2 \cdot v_4$ // $1M$
11: $v_1 \leftarrow v_1 \cdot Z_Q$ // $1M$
12: $v_2 \leftarrow v_2 - v_1$ // $1s$
13: $v_2 \leftarrow v_2 \cdot Z_+$ // $1M$
14: $Y' \leftarrow v_2 - v_3$ // $1s$
15: $v_1 \leftarrow 2B \cdot y_P$ // $1c$
16: $v_1 \leftarrow v_1 \cdot Z_Q$ // $1M$
17: $v_1 \leftarrow v_1 \cdot Z_+$ // $1M$
18: $X' \leftarrow v_1 \cdot X_Q$ // $1M$
19: $Z' \leftarrow v_1 \cdot Z_Q$ // $1M$
20: return $(X' : Y' : Z')$

FIG. 9

Algorithm D.1 SF(G, semifull)

INPUT: full affine generator $G$ of order $n$.
OUTPUT: random scalar $t$ (mod $n$), projective point $T = [t]G$ (mod $\pm 1$ if $semifull = true$).

1: $t \xleftarrow{\$} \mathbb{Z}/n$
2: $\pm T, \pm(T+G) \leftarrow ML^+(t, \pm G)$
3: $r \xleftarrow{\$} \mathbb{F}_p \setminus \{0\}$
4: if $semifull$ then
5: $\quad (X', Y', Z') \leftarrow OS(G, \pm T, \pm(T+G))$
6: $\quad$ return $t, (r \cdot X' : r \cdot Y' : r \cdot Z')$
7: else
8: $\quad$ return $t, (r \cdot X' : r \cdot Z')$
9: end if

CRYPTOGRAPHIC KEY GENERATION USING KUMMER VARIETIES

CROSS REFERENCE TO RELATED APPLICATIONS

The present application claims priority to U.S. Provisional Patent Application No. 62/785,170, "EFFICIENT, PAIRING-FREE, KUMMER-BASED, SELF-CERTIFIED, AUTHENTICATED KEY AGREEMENT," filed on 26 Dec. 2018, incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

This patent application relates to cryptographic communications with computer entities, including for example communications between mobile or non-mobile computer entities, possibly mobile computer entities installed in vehicles, including possibly self-driving (autonomous) vehicles, including connected vehicles.

Some embodiments include generation of cryptographic keys. In some embodiments, the keys are suitable for establishing authenticated key agreements between communicating entities.

BRIEF DESCRIPTION OF THE DRAWINGS

FIGS. 3, 4, 5, 6, 7, 8, 9, 10 illustrate methods performed in some embodiments of the present invention.

DETAILED DESCRIPTION OF SOME EMBODIMENTS

Figure 1:
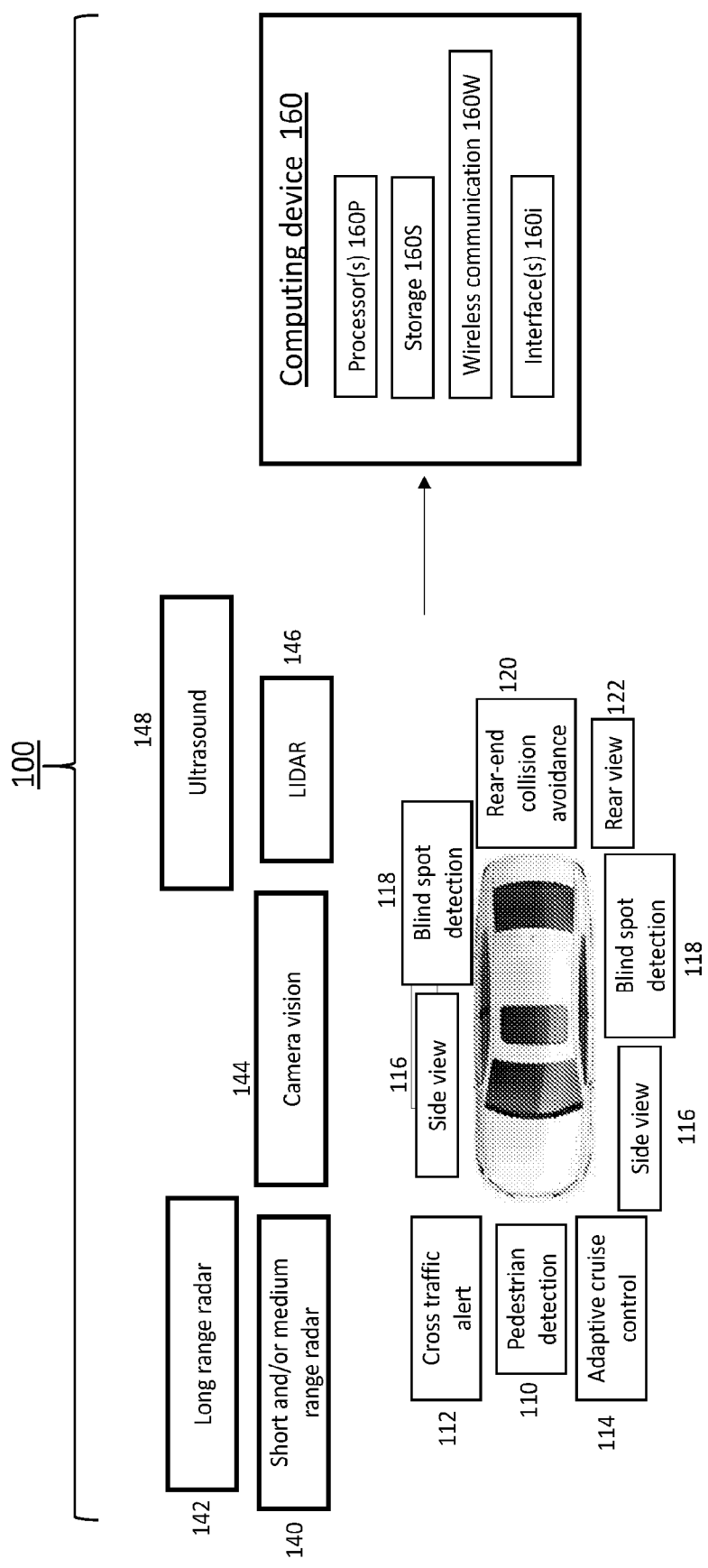
FIG. 1 illustrates an autonomous vehicle whose subsystems and/or functional blocks can be modified to operate according to some embodiments of the present invention.

This description and the accompanying drawings that illustrate aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one skilled in the art. Like numbers in two or more figures represent the same or similar elements.

In this description, specific details are set forth describing some embodiments consistent with the present disclosure. Numerous specific details are set forth in order to provide a thorough understanding of the embodiments. It will be apparent to one skilled in the art, however, that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Overview

Recent history has seen a surge in digital technologies in many industries, including the automotive industry. Also, with the introduction of Internet of Things (IoT) and its applications in lateral paradigms (including automotive industry), revolutionary changes are happening in at least the following sectors: seamless consumer electronic experience; advanced driver assisted safety and fleet management systems; improved battery technology (with the possible inclusion of renewable energy); smart interactions of Vehicle-to-Vehicle (V2V), Vehicle-to-Infrastructure (V2I), and Vehicle-to-Pedestrian (V2P); and autonomous driving.

Although the application of break-through technologies in the automotive and other industries is inevitable, the safety, security and privacy concerns will be paramount. In particular, in terms of automobile safety, the automotive industry is exploring new ways to trigger driver state alerts, incorporate safety electronics and improve human to machine interaction. Moreover, the connected vehicles technology revived the interest in exploring interaction models with vehicles (e.g. V2V, V2I, and V2P, collectively called V2X; see U.S. Pre-Grant Patent Publication No. 2019/0123915 A1, inventors: Simplicio, Jr. et. al, published Apr. 25, 2019, incorporated herein by reference).

With the introduction of V2X technology, we are witnessing the emergence of disparate domains and the need for secure communication channels, possibly including authenticated key agreements, between these domains.

FIG. 1 is a functional block diagram of an autonomous vehicle, 100, according to some embodiments. In particular, FIG. 1 illustrates an autonomous vehicle's subsystems and functional blocks that, for example, may need to securely communicate with each other and/or with other vehicles and/or with non-vehicular equipment. In some embodiments, the functional blocks include pedestrian detection block 110, cross traffic alert block 112, adaptive cruise control 114, side view blocks 116, blind spot detection blocks 118, rear end collision avoidance 120, rear view block 122, and/or other types of functional blocks. The functional blocks can be implemented using sensor subsystems in the vehicle, e.g. short and/or medium range radar subsystem 140, long range radar subsystem 142, camera vision 144, LIDAR 146, ultrasound subsystem 148, and/or other subsystems, possibly supplied by Tier 2 suppliers. These subsystems can have their own (private) keys stored securely within the vehicle in a Hardware Security Module (HSM), or Trusted Platform Module (TPM).

In order to share the collected sensory data with other entities (e.g. sensor fusion unit) within the vehicle or outside the autonomous vehicle 100, the subsystems need to communicate over one or more secure channels. To establish such a channel, escrow-less, authenticated keys should be generated, and an authenticated key agreement can be desirable.

Some embodiments provide new cryptographic techniques for a computer entity, e.g. in a vehicle subsystem, to generate an authenticated private/public key pair that can be used for many cryptographic purposes, including establishment of an escrow-less, authenticated key agreement. The cryptographic techniques utilize Kummer varieties on elliptic curve groups. In some embodiments, the public key is self-certified: it can be authenticated without a digital certificate, by combining the public key with the user's ID or other attribute and with a public key of a certification authority (CA).

An authenticated key agreement can be established by two or more entities that have generated their private/public key pairs using the Kummer variety techniques mentioned above. The authenticated key agreement provides an authenticated, shared secret key. In some embodiments, the shared key is a short-term key (e.g. session key), while the private/public key pairs are used as long-term keys. Forward security can thus be provided. Forward security is described in Ik Rae Jeong, Jonathan Katz, Dong Hoon Lee, "One-Round Protocols for Two-Party Authenticated Key Exchange", 2008 ("Jeong-Katz-Lee reference" below), incorporated herein by reference.

Moreover, in some embodiments, low computational cost is achieved by avoiding bilinear pairings. Bilinear pairings have been used in many protocols, including the "McCullagh-Barreto" protocol for establishing an identity-based, authenticated key agreement as described in Noel McCullagh and Paulo S. L. M. Barreto, "A New Two-Party Identity-Based Authenticated Key Agreement", Cryptology ePrint Archive: Report 2004/122 (2004), https://eprint.iacr.org/2004/122, incorporated herein by reference. Protocols like McCullagh-Barreto appear attractive due to their perceived small bandwidth requirements, but they depend on bilinear pairings. Despite the availability of fairly fast pairing algorithms, pairings tend to introduce inefficiencies. For example, in the field of identity-based digital signatures, pairings are hardly competitive with the speeds attainable by the qDSA protocol that only depends on Kummer multiplications by scalar; see Joost Renes and Benjamin Smith, "qDSA: Small and Secure Digital Signatures with Curve-based Diffie-Hellman Key Pairs", https://eprint.iacr.org/2017/518, 2017, incorporated herein by reference.

In some embodiments, private/public key generation and authenticated key agreement protocols do not use bilinear pairings. However, the invention is not limited to total exclusion of bilinear pairings, or to any particular speed or bandwidth benefits.

As such, some embodiments of the present invention relate to cryptographic communication between different subsystems 140-148 (FIG. 1) and/or functional blocks 110-122 on the same or different vehicles (e.g. autonomous vehicle 100) or other mobile and/or non-mobile devices, including possibly terrestrial vehicles, marine vehicles, airborne vehicles, spaceships, mobile phones, or other communicating devices, possibly communicating over wired and/or wireless network links.

Each subsystem and/or functional block, or groups of subsystems and/or blocks, may each include, or share, a computing device 160 (FIG. 1) used by the vehicles, subsystems, functional blocks, or other entities or objects, e.g., for communicating, coordinating, etc. in the environment of FIG. 1. Computing device 160 includes one or more computer processors 160P coupled to computer storage (memory) 160S, and wireless communication equipment 160W for radio communications. Non-wireless communication equipment can also be present. Operation of computing device 160 is controlled by processor(s) 160P, which may be implemented as one or more central processing units, multi-core processors, microprocessors, microcontrollers, digital signal processors, field programmable gate arrays (FPGAs), application specific integrated circuits (ASICs), graphics processing units (GPUs), tensor processing units (TPUs), and/or the like in computing device 160P.

Memory 160S may be used to store software executed by computing device 160 and/or one or more data structures used during operation of computing device 160. Memory 160S may include one or more types of machine readable media. Some common forms of machine readable media may include floppy disk, flexible disk, hard disk, optical disk, magnetic tape, any other magnetic medium, CD-ROM, any other optical medium, punch cards, paper tape, any other physical medium with patterns of holes, RAM, PROM, EPROM, EEPROM, FLASH-EPROM, any other memory chip or cartridge, and/or any other medium from which a processor or computer is adapted to read.

Processor(s) 160P and/or memory 160S may be arranged in any suitable physical arrangement. In some embodiments, processor 160P and/or memory 160S may be implemented on a same board, in a same package (e.g., system-in-package), on a same chip (e.g., system-on-chip), and/or the like. In some embodiments, processor 160P and/or memory 160S may include distributed, virtualized, and/or containerized computing resources. Consistent with such embodiments, processor(s) 160P and/or memory 160S may be located in one or more data centers and/or cloud computing facilities. In some examples, memory 160S may include non-transitory, tangible, machine readable media that includes executable code that when run by one or more processors (e.g., processor(s) 160P) may cause the computing device 160, alone or in conjunction with other computing devices in the environment, to perform any of the methods described further herein.

Computing device or equipment 160 may include one or more human user interfaces 160i, e.g. such as keyboard, keypad, display, touchscreen, speaker, microphone, etc. present in a smartphone, an automotive information device, or some other type device, for use by pedestrians, vehicle drivers, passengers, traffic managers, and possibly other people.

Illustrated herein are some key generation embodiments on the example of authenticated, ID-based, self-certified keys generated using Kummer arithmetic for nearly all operations (with a small and very constrained, low-impact exception in key certification, requiring a small, constant number of finite field operations apart from Kummer arithmetic, if the keys are used as long-term keys to generate a shared authenticated self-certified short-term key).

Preliminaries

In what follows, let the target security level be $2^\lambda$, and let $\langle G \rangle$ be a cryptographic Abelian group of prime order $n \approx 2^{2\lambda}$. Also, let GG, HH, and KK be random oracles, which can be replaced by harsh functions in many implementations:

$GG: \langle G \rangle \to \{0,1\}^{2\lambda}$ $HH: \langle G \rangle \times \langle G \rangle \times \{0,1\}^* \to \{0,1\}^\lambda$, with the $HH$ values interpreted to lie on $\mathbb{Z}/n$ $KK: \{0,1\}^* \times \{0,1\}^* \times \langle G \rangle \times \langle G \rangle \times \langle G \rangle \times \langle G \rangle \to \{0,1\}^\lambda$.

Schnorr Signatures

Some embodiments can be easier understood by first reviewing Schnorr's traditional signature scheme, described in Holger Petersen, Patrick Horster, "Self-Certified Keys—Concepts and Applications", 3 Conf. on Communications and Multimedia Security, Athens, September 22-23, Chapman & Hall, incorporated herein by reference.

According to this scheme, the signer's key pair is $(z \in \mathbb{Z}/n, V \leftarrow [z]G)$. Of note, the square brackets in the expression $[z]G$ denote scalar multiplication, i.e. the sum of z elements each of which is equal to G.

To sign a message m, the signer picks a signing formal key pair ("formal" means that the key pair will not necessarily be directly used as keys in communication between different entities):

$$\left(r \xleftarrow{\$} \mathbb{Z}/n,\ R \leftarrow [r]G\right)$$

where $ denotes random sampling with uniform distribution. The signer computes $$h \leftarrow HH(R, V, m),\ s \leftarrow r + hz \pmod{n}.$$

The signature is the pair $(R, s) \in \langle G \rangle \times \mathbb{Z}/n$, or equivalently the pair $(h, s) \in \{0,1\}^\lambda \times \mathbb{Z}/n$.

To verify a signature $(R, s)$, the verifier computes $$h \leftarrow HH(R, V, m)$$

and checks that $[s]G - [h]V = R$. Equivalently, to verify a signature $(h, s)$, the verifier computes $$R \leftarrow [s]G - [h]V$$

and checks that $HH(R, V, m) = h$.

Remark 1. It is perhaps more commonplace to define the signing equation as:

$$s \leftarrow r - hz \pmod{n}$$

and the corresponding verification equation as $[s]G + [h]V = R$, and similarly for the alternative signature form. Either possibility is equally secure and incurs the same computational cost. The form described above is adopted purely for notation convenience in the integration within the protocols. With qDSA signatures, this difference will actually become irrelevant.

The public key V, intended for verification, is included in the HH hash to prevent simultaneous attacks against several keys at once.

Jeong-Katz-Lee Key Encapsulation

According to some embodiments using authenticated key agreement, forward security is provided or supported, for example, as described in the Jeong-Katz-Lee reference cited above. The Jeong-Katz-Lee authenticated key encapsulation is provably forward secure, pairing-free, and only depends on scalar multiplications (no further point additions), but requires a certified long-term key for authentication.

In particular, in some embodiments, let $id_i$ be the i-th user's identity, and let the user identities be ordered according to some convention.

Let the i-th user's long-term key pair be $$s_i \in \mathbb{Z}/n,\ V_i \leftarrow [s_i]G$$

and let their ephemeral (session-specific) key pair be $$\left(x_i \xleftarrow{\$} \mathbb{Z}/n,\ Y_i \leftarrow [x_i]G\right)$$

Assume without loss of generality that $id_i < id_j$. After obtaining each other's long term public keys $V_i, V_j$ and exchanging their ephemeral public keys $Y_i, Y_j$, the i-th and j-th users compute $$K \leftarrow KK(id_i, id_j, Y_i, Y_j, [x_i x_j]G, [s_i s_j]G)$$

Note that the i-th user computes the key K as $$K \leftarrow KK(id_i, id_j, Y_i, Y_j, [x_i]Y_j, [s_i]V_j),$$

and the j-th user does similarly, keeping the order of identities and keys.

Intuitively, $[s_i s_j]G$ plays the role of a symmetric MAC key, which is used to authenticate the whole session transcript. Similarly, $[x_i x_j]G$ plays the role of an ephemeral shared Diffie-Hellman secret to ensure forward secrecy.

This protocol is provably secure as long as the long-term keys are genuine, which typically means they are certified somehow.

Petersen-Horster Self-Certified Key Generation with Commitments

The Petersen-Horster scheme, described in the Petersen-Horster reference cited above, relies on Schnorr signatures, which requires point additions besides scalar multiplications. Note also related protocols, that are ultimately based on Petersen-Horster, and include a Petersen-Horster authenticated key agreement protocol (which depends doubly on Schnorr signatures), and specifically the protocols or techniques described in the following documents, incorporated herein by reference: (1) Baek-Safavi-Naini-Susilo certificateless encryption, described in Joonsang Baek, R. Safavi-Naini, Willy Susilo, "Certificateless public key encryption without pairing" (2005), in J. Zhou, J. Lopez, R. Deng & F. Bao (Eds.), *International Information Security Conference* (pp. 134-148), Germany: Springer; (2) He-Chen key agreement. See Debiao He, Sahadeo Padhye, Jianjua Chen, "An efficient certificateless two-party authenticated key agreement protocol", *Computers and Mathematics with Applications* 64 (2012), 1914-1926.

In some embodiments, systems and methods of the present disclosure strengthen the Petersen-Horster scheme by introducing commitments to certain values exchanged by the parties. Also, in some embodiments, the scheme is strengthened by including the CA's public key Z in the certificate hash as described below.

In the Petersen-Horster scheme, self-certified keys are generated using interaction with a Certification Authority (CA). The scheme attains Girault level-3 trust, defined as that the CA cannot feasibly compute the users' private keys nor impersonate a user in an undetectable fashion. To attain Girault level-3 trust, the Petersen-Horster self-certification scheme adopts weak blind Schnorr signatures, which depend on the sum of points chosen independently by each party. (The difficulty in proving the security of fully blind Schnorr signatures is not an issue here, since the weak blind Schnorr signature scheme is sufficient, and is simpler to handle.) This makes it desirable that neither party can influence that sum to its advantage, which might be possible if one party reveals its point after seeing the other's, as in the original Petersen-Horster scheme. Now a simple variant of Petersen-Horster will proposed, where the parties commit to their chosen points before revealing them.

Assuming the interaction between the user and the CA is conducted over a secure channel (so they only need to ensure robustness against each other), the commitment is accomplished by exchanging the hashes of certain values as commitments to such values, before exchanging the values themselves, then checking the hashes before completing the protocol.

The protocol is briefly as follows. The CA picks a key pair $$\left(z \xleftarrow{\$} \mathbb{Z}/n,\ Z \leftarrow [z]G\right)$$

and publishes Z.

The i-th user picks a masking formal key pair $$\left(t_i \xleftarrow{\$} Z/n, T_i \leftarrow [t_i]G\right)$$

and sends the commitment $c \leftarrow GG(T_i)$ to the CA.

The CA picks a certifying formal key pair $$\left(r_i \xleftarrow{\$} Z/n, R_i^0 \leftarrow [r_i]G\right)$$

and sends the commitment $d \leftarrow GG(R_i^0)$ to the user.

The user sends the public key $T_i$ to the CA.

The CA checks that $$c=GG(T_i)$$

(and aborts on inequality). Then the CA computes $$R_i \leftarrow R_i^0 + T_i,$$

$$h_i \leftarrow HH(R_i, Z, id_i),$$

$$s_i^0 \leftarrow r_i + h_i z \pmod{n}$$

and returns the pair $(s_i^0, R_i)$ to the user.

The user checks that $$d=GG(R_i-T_i)$$

(and aborts on inequality). Then the user computes $$s_i \leftarrow s_i^0 + t_i,$$

$$V_i \leftarrow [s_i]GG,$$

$$h_i \leftarrow HH(R_i, Z, id_i)$$

and checks that $$V_i = R_i + [h_i]Z$$

(and aborts on inequality). The actual, self-certified key pair is then $(s_i, V_i)$, and all that the user needs to publish as their self-certified public key is $R_i$, since any other entity can compute $$h_i \leftarrow HH(R_i, Z, id_i)$$

and recover $$V_i \leftarrow R_i + [h_i]Z.$$

The robustness of this construction becomes clear with the observation that any adversary capable of obtaining, without knowledge of z, a triple (id*, s*, R*) such that $$[s^*]G = R^* + [h^*]Z \text{ with } h^* = HH(R^*, Z, id^*),$$

will also clearly be able to existentially forge a (plain) Schnorr signature (s*, h*) for the (existential) message id* against the public key Z.

Besides, a CA that can recover a user's private key s from a given pair (id, T) will also clearly be able to solve the discrete logarithm $t = s - s^0$ of T to the base G.

Notice that the public key Z is included in the certificate hash $h_i$ to prevent simultaneous attacks against multiply authority keys (this was not covered in the Petersen-Horster reference).

Renes-Smith Quotient Digital Signature Algorithm (qDSA)

Renes-Smith qDSA signatures, referenced above, enable Schnorr-style signing with only scalar multiplications in Kummar varieties, but no further key arithmetic.

The qDSA signature scheme operates not in $\langle G \rangle$ but rather in the Kummer variety $GGG := \langle G \rangle / \pm$, wherein every pair of points $\{P, -P\} \subset \langle G \rangle$ uniquely corresponds to a single element $\pm P \in GGG$. If P is represented by affine coordinates (x,y), the point P can be represented by projective coordinates (X:Y:Z), where x=X/Z and y=Y/Z.

For an underlying Montgomery curve over $F_p$ given by the affine equation $$E_M: By^2 = x^3 + Ax^2 + x$$

with $A \notin \{0, \pm 2\}$ and $B \neq 0$, this means that, for any $P = (x, y) \in E_M$, the point $\pm P$ can be conveniently represented by the affine x-coordinate $\overline{\pm P} := x \in F_p$ in the protocol, or else (during computations) by a pair $(X:Z) \in F_p^2$ of projective coordinates such that $$\overline{\pm P} = X/Z = XZ^{p-2}$$

(with the reasonable convention of denoting the point at infinity by 0, since the affine point (0,0) on the Montgomery curve has order 2 and thus is not in a group of cryptographic relevance).

As described in the Renes-Smith reference, if P and Q are points on the elliptic curve, the following operation is well defined on a Kummer variety:

$$\{\pm P, \pm Q\} \rightarrow \{\pm(P+Q), \pm(P-Q)\}$$

Therefore, the following pseudo-addition operation xADD is well defined:

$$xADD: (\pm P, \pm Q, \pm(P-Q)) \rightarrow \pm(P+Q)$$

See Algorithm A.3 (FIG. 5) described in the APPENDIX below.

If P=Q, then xADD can be viewed as a pseudo-doubling operation, denoted xDBL herein, providing the output $\pm[2]P$. See Algorithm A.4 (FIG. 6).

The qDSA signature protocol resembles Schnorr signatures. A hash function $$HH: F_p \times F_p \times \{0,1\}^* \rightarrow Z/n$$

can be customized as $$\overline{HH}: F_p \times F_p \times \{0,1\}^* \rightarrow Z^+/n$$

such that $$\overline{HH}(\bullet) := HH(\bullet) \text{ if } lsb(HH(\bullet))=0, \text{ and}$$

$$\overline{HH}(\bullet) := -HH(\bullet) \text{ if } lsb(HH(\bullet))=1,$$

where lsb(•) denotes the least significant bit of the binary representation of its argument. Notice that $\overline{HH}$ still yields λ-bit values.

The signer's key pair is $(z \in Z/n, \pm V \leftarrow \pm[z]G)$.

To sign a message m, the signer picks a signing formal key pair $$\left(r \xleftarrow{\$} Z/n, \pm R \leftarrow \pm[r]G\right)$$

and computes $$h \leftarrow \overline{HH}(\pm R, \pm V, m), s \leftarrow r + hz \pmod{n}.$$

The signature is the pair $(\pm R, s) \in F_p \times Z/n$.

To verify a signature $(\pm R, s)$, the verifier computes $$h \leftarrow \overline{HH}(\pm R, \pm V, m)$$

and checks that $$\pm R \in \{\pm([s]G+[h]V), \pm([s]G-[h]V)\}.$$

This check can be carried out efficiently for Montgomery curves by computing the Renes-Smith function $RS(\pm[s]G, \pm[h]V, \pm\overline{R})$, described in FIG. 8 as Algorithm B.1.

Protocols

According to some embodiments, systems and methods of the present disclosure implement various protocols including, for example, protocols for private/public key generation and authenticated key agreement.

Figure 2A:
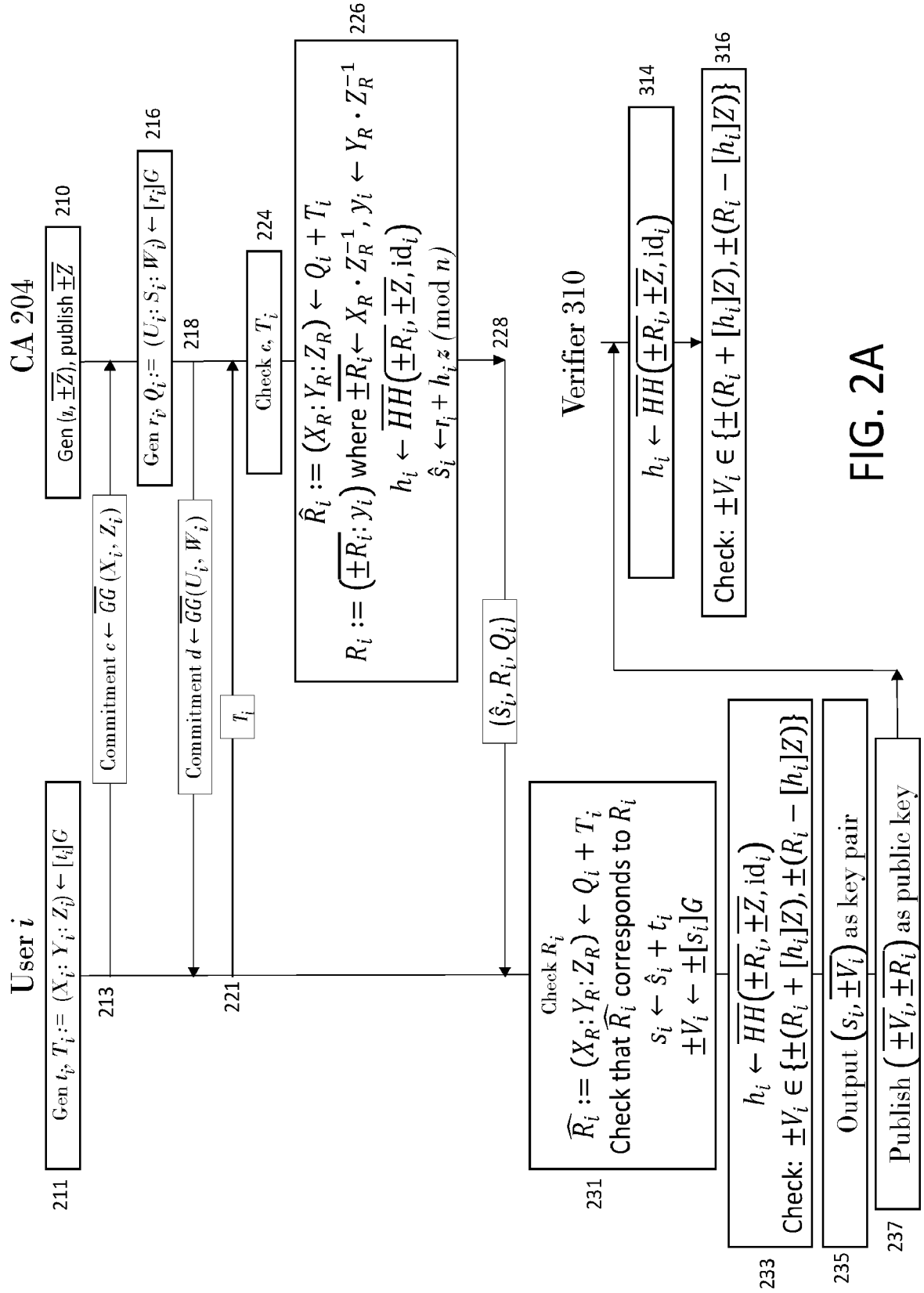
FIGS. 2A and 2B are diagrams of key generation methods according to some embodiments of the present invention.
Figure 2B:
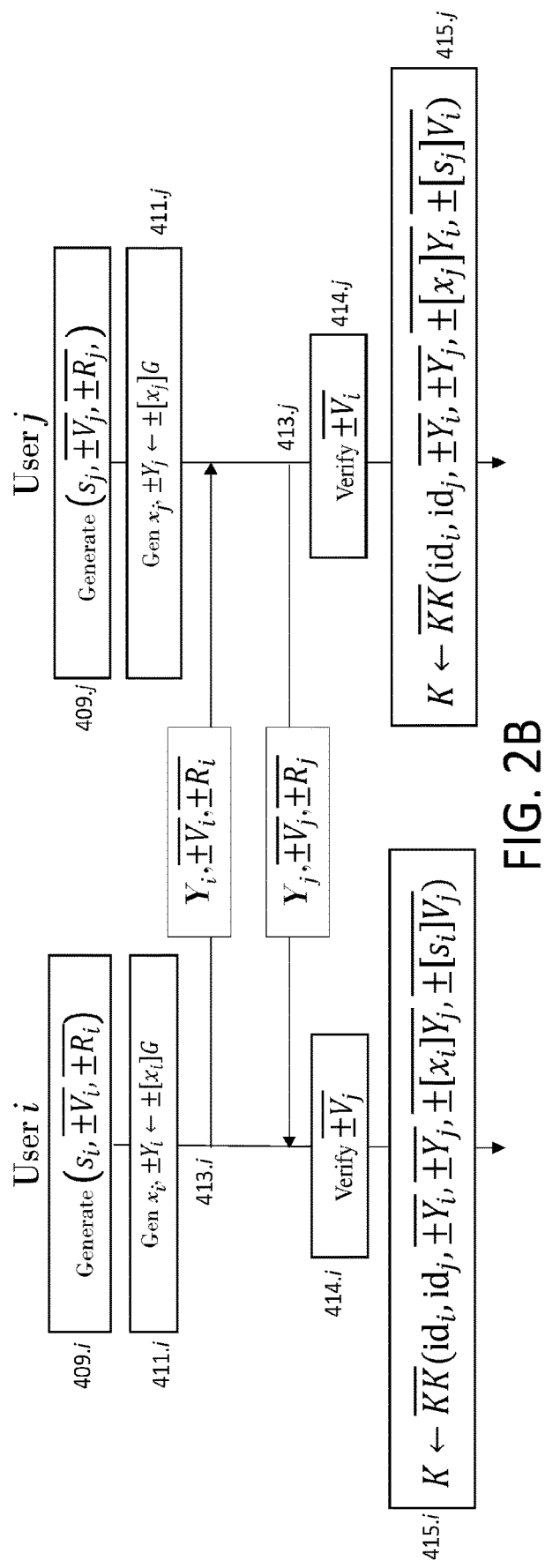

One embodiment of the present invention is shown in FIG. 2A. For each user i, this embodiment outputs, at step 235, the user's private/public key pair $(s_i, \pm V_i)$, or at step 237 the private public key pair $(s_i, (\pm V_i, \pm R_i))$—in some protocols, the value $\pm R_i$ is only used for verifying the validity of public key $\pm V_i$. Such key pairs can be used for many cryptographic algorithms, including generation of authenticated shared keys as shown in FIG. 2B.

The process of FIG. 2A includes interaction between an exemplary user i and CA 204. Each user may or may not use the same CA. Each user, and each CA 204, can be a computing device such as 160 in FIG. 1. The CA and user i communicate over a network, possibly (but not necessarily) a wireless network.

In some embodiments, the interaction between user i and CA 204 is conducted over a secure channel so they only need to further ensure robustness against each other.

The underlying elliptic curve can be a Montgomery curve, an Edwards curve, or some other type; suitable curves can be as in RFC 7748, "Elliptic Curves for Security" (Internet Research Task Force, 2016), incorporated herein by reference. Some embodiments use Montgomery curve Curve25519, defined in RFC 7748. Whichever curve is chosen, the curve is defined over some finite field $F_p$, where p is a power of a prime number. For Curve25519, the field $F_p$ is a prime field, where the prime number $p=2^{255}-19$.

The generator G of the elliptic curve group, or its subgroup, is possibly public, and is assumed available to all parties as a full normalized projective point $G:=(x_G:y_G:1)$. The group $\langle G \rangle$ has a prime order n as noted above.

The commitment hash function is customized as $$\overline{GG}:F_p \times F_p \to \{0,1\}^{2\lambda}.$$

and the key agreement hash function (FIG. 2B) is customized as $$\overline{KK}:\{0,1\}^* \times \{0,1\}^* \times F_p \times F_p \times F_p \times F_p \to \{0,1\}^{\lambda}$$

to allow for projective points.

In some embodiments, systems and methods of the present disclosure only require the Kummer variety GGG to support pseudo-addition (xADD) rather than proper addition; points used as blinding masks are exchanged in projective form to facilitate efficiently mapping them to $\langle G \rangle$. As a consequence, their coordinates should be sanitized with random multiplicative masks.

In some embodiments, all entities (i.e. the users and the CA) check that received points are in the proper algebraic structures.

Turning now to FIG. 2A, step 210, the CA generates a key pair $$\left(z \xleftarrow{\$} Z/n, \pm\overline{Z} \leftarrow \pm[z]G\right)$$

and publishes $\pm\overline{Z}$. (As noted above, $ denotes random sampling with uniform distribution, but the invention is not limited to uniform distribution; also, pseudo-random value generation can be used.)

At step 211, user i generates a key pair $$\left(t_i \xleftarrow{\$} Z/n, T_i := (X_i:Y_i:Z_i) \leftarrow [t_i]G\right)$$

In some embodiments, this is done using the SF function (FIG. 10, Algorithm D.1):

$$(t_i, T_i := (X_i:Y_i:Z_i)) \leftarrow SF(G, \text{true})$$

At step 213, the user generates and sends to the CA the commitment $C \leftarrow \overline{GG}(X_i, Z_i)$.

At step 216, the CA generates a key pair $$(r_i, Q_i := (U_i:S_i:W_i)) \leftarrow [r_i]G$$

In some embodiments, this is done using the SF function defined as Algorithm D.1:

$$(r_i, Q_i := (U_i:S_i:W_i)) \leftarrow SF(G, \text{true})$$

At step 218, the CA generates and sends the commitment $d \leftarrow \overline{GG}(U_i, W_i)$ to the user.

At step 221, after receiving d, the user sends $T_i$ to the CA.

At step 224, the CA checks that $T_i$ is a proper group element (namely, a curve point of order n) and that $$c = \overline{GG}(X_i, Z_i)$$

(and aborts if any of the checks fails). Then at step 226, the CA performs the following operations. The CA computes $$\hat{R}_i := (X_R:Y_R:Z_R) \leftarrow Q_i + T_i$$

(using elliptic curve group addition rather than Kummer pseudo-addition, since the projective points are known in full). The CA normalizes the sum to:

$$R_i := (\pm\overline{R}_i; y_i)$$

where $\pm\overline{R}_i \leftarrow X_R \cdot Z_R^{-1}$, $y_i \leftarrow Y_R \cdot Z_R^{-1}$, with $Z_R^{-1} \leftarrow Z_R^{p-2}$.

The CA then computes $$h_i \leftarrow \overline{HH}(\pm\overline{R}_i, \pm\overline{Z}, id_i), \hat{s}_i \leftarrow r_i + h_i z \pmod{n}$$

At step 228, the CA sends $(\hat{s}_i, R_i, Q_i)$ to the user.

At step 231, the user performs the following operations. The user checks that $R_i := (\pm\overline{R}_i; y_i)$ is a proper group element (namely, a curve point of order n). The user further computes $$\hat{R}_i := (X_R:Y_R:Z_R) \leftarrow Q_i + T_i,$$

and checks that $\hat{R}_i$ corresponds to $R_i$, i.e. that $X_R = \pm\overline{R}_i \cdot Z_R$ and $Y_R = y_i \cdot Z_R$ and that $d = \overline{GG}(U_i, W_i)$. The user aborts if any of these checks fails). Then the user computes $$s_i \leftarrow \hat{s}_i + t_i, \pm V_i \leftarrow \pm[s_i]G$$

At step 233, the user computes $$h_i \leftarrow \overline{HH}(\pm\overline{R}_i, \pm\overline{Z}, id_i)$$

and checks that $$\pm V_i \in \{\pm(R_i+[h_i]Z), \pm(R_i-[h_i]Z)\}$$

This check can be performed using the RS function defined in FIG. 8 (Algorithm B.10, and in particular by performing $RS(\pm\overline{R}_i, \pm[h_i]\overline{Z}, \pm\overline{V}_i)$. The user aborts if any of the checks fails.

At step 235, the user (the computing device 160) outputs the private/public key pair $(s_i, \pm V_i)$, and at step 237 the user publishes $(\pm V_i, \pm R_i)$ as their self-certified public key, wherein the $\pm R_i$ value can be used for verifying the key $\pm V_i$. Any of the two public key pairs can be used as a long-term key or in some other way. Any other entity (computing device 160 of Verifier 310) can compute, at step 314, $$h_i \leftarrow \overline{HH}(\pm R_i, \pm Z, id_i)$$

and can check, at step 316, that $$\pm V_i \in \{\pm(R_i+[h_i]Z), \pm(R_i-[h_i]Z)\},$$

i.e. check $$RS(\pm R_i, \pm [h_i]Z, \pm V_i).$$

Of note, the Renes-Smith verification at steps 233, 316 is less expensive than in general projective point operations, since the first argument in computing $h_i$ is always normalized to $\pm R_i$.

Authenticated Key Agreement

The self-certified keys of the process of FIG. 2A can be used in any protocol that depends essentially on multiplications by scalar, e.g. can be performed using just scalar multiplication in an elliptic curve group. The authenticated key agreement protocol of FIG. 2B is just one instance of such a protocol. Other examples could involve signatures, including hierarchical signature protocols.

To establish a secure session according to FIG. 2B, assume without loss of generality that the user's identifies are ordered in some way, and in particular the i-th user identity $id_i$ precedes the j-th user identity $id_j$.

At step 409.i, user i performs the process of FIG. 2A to generate the long-term keys $(s_i, \pm V_i, \pm R_i)$; see steps 231-237. Likewise, at step 409.j, user j generates the long-term keys $(s_j, \pm V_j, \pm R_j)$. These steps can be performed only once per many sessions.

At step 411.i, the i-th user generates a session-specific (i.e. ephemeral) key pair $$(x_i, \pm Y_i) \leftarrow \pm[x_i]G$$

In some embodiments, this is accomplished by using the SF function (FIG. 10) as follows:

$$(x_i, \pm Y_i) \leftarrow SF(G, \text{false})$$

At step 411.j, the j-th user performs a similar operation, to generate the ephemeral keys $$(x_j, \pm Y_j) \leftarrow \pm[x_j]G$$

At steps 413.i, 413.j, the users exchange their long-term public keys $(\pm V_i, \pm R_i)$ and $(\pm V_j, \pm R_j)$, and exchange their ephemeral public keys $\pm Y_i$ and $\pm Y_j$. In some embodiments the long-term public keys $(\pm V_i, \pm R_i)$ and $(\pm V_j, \pm R_j)$ are exchanged only once per many sessions rather than in each session.

At steps 414.i, 414.j, the respective users i and j check the other user's long-term public keys $(\pm V_j, \pm R_j)$, $(\pm V_i, \pm R_i)$ as in steps 314, 316. This operation can be performed only once per many sessions.

At step 415.i, the i-th user computes the shared session key as $$K \leftarrow \overline{KK}(id_i, id_j, \pm Y_i, \pm Y_j, \pm[x_i]Y_j, \pm[s_i]V_j)$$

Similarly, at step 415.j, the j-th computes the shared key as $$K \leftarrow \overline{KK}(id_i, id_j, \pm Y_i, \pm Y_j, \pm[x_j]Y_i, \pm[s_j]V_i)$$

In either case, the shared key is $$K = \overline{KK}(id_i, id_j, \pm Y_i, \pm Y_j, \pm[x_i x_j]G, \pm[s_i s_j]G).$$

The shared key K can then be used by users i and j as a symmetric key for communicating with each other for the entire session. The key can be used for encryption, signature, and/or any other cryptographic use.

Of note, all the four public keys (long-term and ephemeral) can be compressed at the cost of a single field inversion and nine multiplications using Montgomery's technique. This requires the ephemeral keys to be exchanged in projective form, but a trade-off is possible whereby the ephemeral keys are compressed before being exchanged at the cost of one extra inversion (and three rather than nine multiplications).

Efficiency Analysis

In the McCullagh-Barreto protocol, each party (Alice and Bob) sends one group element to the other. In the above authenticated key agreement protocol, each user sends one $(\pm V_i, \pm R_i)$ pair, i.e. two group elements, to the other; see step 237. At first sight it appears that the bandwidth use is twice as large for the protocol of FIG. 2A.

However, in practice the difference is much smaller. For bilinear pairings, to cope with recent discrete logarithm attacks in the target pairing group $G_T$, typically one should choose pairing-friendly groups with bitlength at least 50% larger than the expected size for conventional elliptic curve groups. Therefore, the bandwidth use of the proposed protocol of FIG. 2A increases by no more than about 33% as compared with the McCullagh-Barreto protocol.

Besides, the somewhat smaller bandwidth utilization of the McCullagh-Barreto protocol comes at the price of longer processing times, even considering only the pure ECC operations, because of the larger underlying finite field.

In contrast with the McCullagh-Barreto protocol, the method of FIG. 2A does not need key escrow, but in that case there would be no difference in bandwidth at all, since the symmetric pairing needed by McCullagh-Barreto would require a supersingular curve in large characteristic, yielding a bitlength at least twice that of plain ECC.

The invention is not limited to the features discussed above. For example, some embodiments omit one or both of the commitment steps 213, 218, and/or validity checks (e.g. step 233).

Some embodiments of the present invention are defined by the following clauses:

Clause 1 defines a method for generating a first private/public key pair (e.g. $(s_i, \pm V_i)$, or $(s_i, (\pm V_i, \pm R_i))$) by a system comprising a first computer entity (e.g. user i), wherein the first private/public key pair includes a first private key and a corresponding first public key, the method comprising:

generating, by the first computer entity, the first private key (e.g. $s_i$), wherein the first private key depends on a first scalar (e.g. $s_i$), and generating the first private key comprises generating the first scalar by using private key material (e.g. $(\hat{s}_i, R_i, Q_i)$) received from a certification authority (CA) and dependent on the CA's private key;

generating, by the first computer entity, the first public key corresponding to the first private key and dependent on the private key material, wherein generating the first public key comprises computing, by the first computer entity, an element of a Kummer variety (e.g. $\pm V$) of a finite elliptic curve group, the element being dependent on the private key material.

2. The method of clause 1 wherein the element of the Kummer variety is:

$$\pm V = \pm[s]G$$

wherein s is the first scalar, and G is a public element of the elliptic curve.

3. The method of clause 2 wherein the element G has a prime order.

4. The method of clause 2 or 3 wherein the order of G corresponds to a predefined security level (e.g. $2\lambda$).

5. The method of any preceding clause wherein each of the private key and the first scalar s depends on an identity $id_i$ associated with the first computer system. (Of note, the identity $id_i$ may include an attribute, e.g. the associated human user's email address, position in a company, and/or the computer system's part number or processor identification, and/or a vehicle's engine ID, etc., including any combination of such values.)

6. The method of any preceding clause wherein the elliptic curve is a Montgomery curve.

7. The method of any preceding clause, wherein the first private/public key pair is a long-term key pair, the first private and public keys being long-term private and public keys, and the method further comprises:

the first computer entity generating a short-term private/public key pair;

the first computer entity providing the long- and short-term public keys to a second computer entity (e.g. user j);

the first computer entity receiving the second computer entity's long term public key and short-term public key; and the first computer entity generating a symmetric secret key for communication with the second computer entity, the symmetric secret key being generated using the first computer entity's long-term and short-term private keys and the second computer entity's long-term and short-term public keys.

8. The method of clause 7, wherein the long- and short-term public keys of the first and second computer entities are elements of the Kummer variety.

9. The method of any preceding clause, wherein obtaining the private key comprises:

generating, by the first computer entity, values ($t_i$, $T_i \leftarrow [t_i]G$), where $t_i$ is a secret of the first computer entity, and G is a public element of the elliptic curve;

sending, by the first computer entity to the CA, a commitment to $T_i$;

receiving, by the first computer entity from the CA, a commitment to a value $Q_i$, wherein the CA is to generate $Q_i$ to be equal to $[r_i]G$, where $r_i$ is the CA's secret generated for communication with the first computer entity;

after receiving $Q_i$, sending the value $T_i$ by the first computer entity to the CA;

receiving from the CA, by the first computer entity, the private key material comprising a triple ($\hat{s}_i, R_i, Q_i$), wherein the CA is to generate $\hat{s}_i$ and $R_i$ so that:

$R_i$ corresponds to $Q_i + T_i$;

$\hat{s}_i$ is a function of $r_i$, $R_i$, and an identity associated with the first computer entity;

checking the triple for validity by the first computer entity;

generating, by the first computer entity, the first scalar as $s \leftarrow \hat{s}_i + t_i$.

10. The method of clause 9 further comprising checking, by the first computer entity, that the element of the Kummer variety corresponds to a combination of: $R_i$, a public key of the CA, and the identity associated with the first computer entity.

11. The method of clause 9 or 10, further comprising publishing, by the first computer system, x-coordinates of the element of the Kummer variety and $R_i$, wherein the x-coordinates are affine coordinates corresponding to a polynomial equation defining the elliptic curve, the polynomial equation having a second degree in coordinate y and a third degree in coordinate x.

12. The method of clause 11 wherein the x-coordinates of the element of the Kummer variety and $R_i$ allow a verifier to verify a validity of the public key by using (a) the public key of the CA and (b) the identity associated with the first computer entity.

13. The method of any preceding clause wherein the system is installed in a vehicle.

14. The method of clause 7 or 8 wherein the first and second computer entities are installed in respective vehicles.

15. A method performed by a certification authority (CA) which is a system comprising a computer entity, to allow another system comprising a first computer entity to generate a first private/public key pair, the method comprising:

generating, by the CA, a first CA key pair (e.g. z, $\pm Z$ at step 210) for use with a plurality of computer entities including the first computer entity, the first CA key pair comprising a first CA private key and a first CA public key;

generating, by the CA, a second CA key pair (e.g. $r_i$, $Q_i \leftarrow [r_i]G$) comprising a scalar and a corresponding element of an elliptic curve, wherein the second CA key pair is associated with the first computer entity;

receiving by the CA, from the first computer entity, an element of the elliptic curve (e.g. $T_i$), wherein the received element is to correspond to the first computer entity's secret scalar ($t_i$);

generating, by the CA, a plurality of values for sending to the first computer entity, the plurality of values comprising:

a first value of the plurality (e.g. $R_i$), the first value corresponding to the sum of: (1) the elliptic curve element of the second key pair (e.g. $Q_i$), and (2) the elliptic curve element received from the first computer entity (e.g. $T_i$);

a second value of the plurality (e.g. $\hat{s}_i$), wherein the second value depends on: the scalar of the second CA key pair (e.g. $r_i$), the elliptic curve element of the second CA key pair ($R_i$), and an identity associated with the first computer entity (e.g. $id_i$);

sending, by the CA to the first computer entity, the first and second values of the plurality and the elliptic curve element of the second key pair.

16. The method of clause 15 wherein generating the first value of the plurality comprises:

generating, in a projective space, the sum (e.g. $Q_i + T_i$) of: (1) the elliptic curve element of the second key pair (e.g. $Q_i$), and (2) the elliptic curve element received from the first computer entity (e.g. $T_i$); and generating the first value of the plurality (e.g. $R_i$) as affine (x,y) coordinates of the sum, the affine (x, y) coordinates corresponding to a polynomial equation defining the elliptic curve, the polynomial equation having a second degree in coordinate y and a third degree in coordinate x.

The invention also includes computer readable media comprising one or more computer instructions for causing a computer entity (e.g. a first computer entity or a certification authority) to perform one or more of the methods described above.

The invention also includes a first computer system comprising one or more computer processors, computer storage, and network communication equipment, the first computer system being configured to perform one or more of the methods described above.

The invention includes a certification authority comprising one or more computer processors, computer storage, and network communication equipment, the certification authority being configured to perform one or more of the method described above.

The invention includes vehicles or other mobile or non-mobile systems configured to communicate using one or more of the methods described above.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

APPENDIX

In the algorithms below, the Cost notation is as in Craig Costello and Benjamin Smith, "Montgomery curves and their arithmetic: The case of large characteristic fields", Cryptology ePrint Archive: Report 2017/212, https://eprint.iacr.org/2017/212 (2017), incorporated herein by reference. Specifically, the letters M, S, A, s, c denote respectively multiplication, squaring, addition, subtraction, and multiplication by a precomputed constant in a finite field $F_q$. For example, in Algorithm A.3, "4M+2S+3a+3s" denotes 4 multiplications, 2 squarings, 3 additions, and 3 subtractions.

When algorithms use elliptic curve parameters, we assume that the elliptic curve is a Montgomery curve represented as:

$$By^2 = x^3 + Ax^2 + x$$

where $A^2 \neq 4$ and $B \neq 0$. As is well known, Curve25519 is defined by the following equation over the prime field $F_p$ where the prime number $p = 2^{255} - 19$:

$$y^2 = x^3 + 486662x^2 + x$$

(A=486662, B=1).

The Montgomery Ladder

Laddering multiplication by scalar—see Algorithm A.1 in FIG. 3, Algorithm A.2 in FIG. 4—uses two functions xADD (Algorithm A.3 in FIG. 5) for differential addition, and xDBL (Algorithm A.4 in FIG. 6) for doubling on a Montgomery curve, and also isochronous conditional swapping xSWP (Algorithm A.5 in FIG. 7) to ensure uniformity of access.

The Renes-Smith Verification Algorithm RS

Verification of Kummer pseudo-addition can be carried out with a method proposed by Renes and Smith; see the Renes-Smith reference cited above, Proposition 3. This method is summarized in FIG. 8 as Algorithm B.1.

The Okeya-Sakurai Algorithm

The Okeya-Sakurai method (Algorithm C.1 in FIG. 9) recovers a full projective point $Q:=(X':\pm Y':Z')$ from an affine point $P:=(x_p:y_p:1)\in(G)$, a partial point $\pm Q:=(X_Q:Z_Q)\in GGG$, and a partial point $\pm(P+Q):=(X_+:Z_+)\in GGG$, where $[2]P \neq O$ and $\pm Q \notin \{\pm P, O\}$, at a cost 10M+1S+2c+3a+3s.

In particular, this method enables recovering the full projective point $[\alpha] P(mod \pm 1)$ from the triple $(P, \pm[\alpha]P, \pm[\alpha+1]P)$, where the point $\pm[\alpha+1]P$ is a by-product of laddering available for free at the end of the computation of $\pm[\alpha]P$.

Multiplication by Scalar

Algorithm D.1 of FIG. 10 creates a random scalar t and computes a sanitized (by a random value $\tau$) projective point $T=[t]G$ (mod±1 if semifull=true).

What is claimed is:

1. A method performed by a certification authority (CA) comprising a computer system, to allow a first computer entity to generate a first private/public key pair, the method comprising:

generating, by the CA, a first CA key pair for use with a plurality of computer entities including the first computer entity, the first CA key pair comprising a first CA private key and a first CA public key;

generating, by the CA, a second CA key pair comprising a scalar and a corresponding element of an elliptic curve, wherein the second CA key pair is associated with the first computer entity;

receiving by the CA, from the first computer entity, an element of the elliptic curve, wherein the received element is to correspond to the first computer entity's secret scalar;

generating, by the CA, a plurality of values for sending to the first computer entity, the plurality of values comprising:

a first value of the plurality, the first value corresponding to the sum of: (1) the elliptic curve element of the second key pair, and (2) the elliptic curve element received from the first computer entity;

a second value of the plurality, wherein the second value depends on: the scalar of the second CA key pair, the elliptic curve element of the second CA key pair, and an identity associated with the first computer entity;

sending, by the CA to the first computer entity, the first and second values of the plurality and the elliptic curve element of the second key pair.

2. The method of claim 1 wherein generating the first value of the plurality comprises:
- generating, in a projective space, the sum of: (1) the elliptic curve element of the second key pair, and (2) the elliptic curve element received from the first computer entity; and
- generating the first value of the plurality as affine (x,y) coordinates of the sum, the affine (x, y) coordinates corresponding to a polynomial equation defining the elliptic curve, the polynomial equation having a second degree in coordinate y and a third degree in coordinate x.

\* \* \* \* \*